United States Patent
Kwak et al.

(10) Patent No.: US 7,990,310 B2
(45) Date of Patent: Aug. 2, 2011

(54) ULTRA-WIDEBAND RANGING METHOD AND SYSTEM USING NARROWBAND INTERFERENCE SUPRESSION WAVEFORM

(75) Inventors: Kyoung Seop Kwak, Incheon (KR); Weihua Zhang, Incheon (KR); Wooshik Kang, Yongin-si (KR)

(73) Assignees: Inha-Industry Partnership Institute, Incheon (KR); Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 12/100,640

(22) Filed: Apr. 10, 2008

(65) Prior Publication Data
US 2009/0029658 A1   Jan. 29, 2009

(30) Foreign Application Priority Data
Jul. 26, 2007 (KR) .................. 10-2007-0075324

(51) Int. Cl.
G01S 13/08 (2006.01)
(52) U.S. Cl. ........ 342/118; 342/134; 342/145; 342/189; 455/114.3; 375/346
(58) Field of Classification Search .................. 342/21, 342/118, 128, 130, 132, 134, 137, 145, 159, 342/175, 189, 194–196, 200–202; 455/63.1, 455/114.3; 370/208, 252, 343, 465, 480; 375/130, 132, 148, 150, 232, 260, 285, 316, 375/346
See application file for complete search history.

(56) References Cited

U.S. PATENT DOCUMENTS

| | | | | |
|---|---|---|---|---|
| 6,072,420 A | * | 6/2000 | Hellsten | 342/25 A |
| 6,834,073 B1 | * | 12/2004 | Miller et al. | 375/130 |
| 7,362,817 B2 | * | 4/2008 | Ojard | 375/285 |
| 7,492,791 B2 | * | 2/2009 | Geile et al. | 370/480 |
| 2005/0013387 A1 | * | 1/2005 | Ojard | 375/316 |
| 2005/0179585 A1 | * | 8/2005 | Walker et al. | 342/134 |
| 2006/0114981 A1 | * | 6/2006 | Ghosh et al. | 375/232 |
| 2007/0153881 A1 | * | 7/2007 | Arslan | 375/150 |
| 2007/0201352 A1 | * | 8/2007 | Geile et al. | 370/208 |
| 2009/0029658 A1 | * | 1/2009 | Kwak et al. | 455/114.3 |
| 2010/0027589 A1 | * | 2/2010 | Bastug et al. | 375/148 |

* cited by examiner

Primary Examiner — John B Sotomayor
(74) Attorney, Agent, or Firm — H.C. Park & Associates, PLC

(57) ABSTRACT

Disclosed herein is an Ultra-WideBand (UWB) ranging method using a narrowband interference suppression waveform. A transmission signal is transmitted to a target object. The transmission signal, reflected from the target object, is received. A template signal is generated by combining the narrowband interference suppression waveform and a channel estimation signal together. A correlation output signal is generated by convoluting the template signal and the received signal. A distance is calculated using a time delay when the correlation output signal has the maximum value thereof. The narrowband interference suppression waveform is any one of two waveforms that are expressed by the following Equation:

$$w_{r1}(t) = g(t-\delta_1/2) + g(t+\delta_1/2)$$

$$w_{r2}(t) = g(t-\delta_2/2) - g(t+\delta_2/2)$$

where g(t) is a basic UWB pulse waveform, $\delta_1 = (N+1/2)f_i$, $\delta_2 = (N)/f_i$, N is an integer, and $f_i$ is the center frequency of a narrowband interference signal.

13 Claims, 6 Drawing Sheets

ULTRA-WIDEBAND RANGING METHOD AND SYSTEM USING NARROWBAND INTERFERENCE SUPRESSION WAVEFORM

BACKGROUND OF THE INVENTION

1. Field of the Invention

The present invention relates generally to an Ultra-Wide-Band (UWB) ranging method and system using a narrowband interference suppression waveform, and, more particularly, to a UWB ranging method and system using a narrowband interference suppression waveform which reduces a ranging error ratio using a specific frequency.

2. Description of the Related Art

Recently, wireless broadband technology has been proposed as the representative wireless technology of the future.

A UWB wireless system has been designed to share the frequency spectrum with an existing wireless system so as to maximize the efficiency of the use of limited frequency resources, thereby further effectively using the frequency resources.

A UWB communication method is defined as a communication method which uses a 500 MHz or wider frequency band, or a wireless communication method in which the percentage of a fraction bandwidth is 20% or more. The UWB communication method is technology that transmits information using monopulses, each having a narrow width equal to or less than 1 ns, instead of a Radio Frequency (RF) carrier.

Such a UWB wireless system does not interfere with some other wireless system, which is currently used, because a low power spectrum, such as baseband noise, exists over a wide band (ranging from 0 Hz to several GHz) due to the characteristics of pulses. Further, since the UWB wireless system uses an ultra-wideband bandwidth, the transmission speed of a signal is faster than that of a general wireless system.

Moreover, since the UWB wireless system does not use a carrier, which has been essentially used in an existing wireless system, data to be transmitted via a corresponding frequency band has intensity similar to that of noise. Therefore, the UWB wireless system does not interfere with wireless equipment that uses the same frequency band as the UWB wireless system, and the power consumption of the transmission/reception device thereof can be remarkably reduced.

Furthermore, the UWB wireless system directly transmits baseband signals through an antenna without up-modulation, and directly demodulates received signals, thereby making it simple to implement a transmission/reception device. In addition, the UWB transmission/reception device using pulses has the characteristic of ultra high-speed data transmission over a short distance, and the width of pulses used for transmission is extremely narrow, thereby enabling the UWB transmission/reception device to be applied to a system which can determine a location with high precision.

In the UWB wireless system, a UWB ranging system, which uses a continuous baseband and measures the distance from an antenna to a destination using pulses without a carrier, is one of the main applications of UWB wireless technology.

Ranging is the measurement of the distance to a remote target object from a known observation or reference point.

In the case in which an extremely short pulse wave is used, as in the UWB communication system, the width of the pulses of a signal is extremely narrow, and the magnitude of the signal that is used is limited, so that there is an advantage in that power consumption is relatively low compared to that of other types of communication systems.

The UWB transmission/reception device using the UWB method has the characteristic of ultra high-speed data transmission over a short distance, and the width of pulses used for transmission is extremely narrow, so that the UWB transmission/reception device can be applied to a system capable of determining a location or distance with high precision.

A system for calculating a distance using a wireless UWB signal transmits/receives a transmission signal between a host terminal and a slave terminal or between respective terminals, and then calculates the distance therebetween using the difference in time between a transmitted signal and a received signal. The measured distance is used as basic data, that is, a reference distance, to three-dimensionally calculate a location by combining a plurality of distances. For ranging, communication, a location tracking system and a sensor network, which use radio signals, the power consumption of respective terminals is a principal factor for the maintenance of the network and the convenience of system utilization.

However, a narrowband interference phenomenon occurs due to the ultra-low output characteristic of the UWB wireless system. If the interference phenomenon is not properly suppressed, a problem occurs in that the accuracy of the UWB ranging system is reduced.

SUMMARY OF THE INVENTION

Accordingly, the present invention has been made keeping in mind the above problems occurring in the prior art, and an object of the present invention is to provide a UWB ranging method and system using a narrowband interference suppression waveform which is capable of suppressing narrowband interference attributable to a specific frequency-based pulse waveform on the basis of two waveforms.

In order to accomplish the above object, the present invention provides an Ultra-WideBand (UWB) ranging method using a narrowband interference suppression waveform, including a first step of transmitting a transmission signal to a target object; a second step of receiving the transmission signal reflected from the target object; a third step of generating a template signal by combining the narrowband interference suppression waveform and a channel estimation signal together; a fourth step of generating a correlation output signal by convoluting the template signal and the signal received at the second step; and a fifth step of calculating a distance using a time delay when the correlation output signal has the maximum value thereof; wherein the narrowband interference suppression waveform is any one of two waveforms that are expressed by the following Equation:

$$w_{r1}(t)=g(t-\delta_1/2)+g(t+\delta_1/2)$$

$$w_{r2}(t)=g(t-\delta_2/2)-g(t+\delta_2/2)$$

where $g(t)$ is a basic UWB pulse waveform, $\delta_1=(N+1/2)f_1$, $\delta_2=(N)/f_1$, N is an integer, and $f_i$ is the center frequency of a narrowband interference signal.

Further, the basic UWB pulse waveform is a Gaussian pulse waveform.

Thereafter, the narrowband interference signal of the signal received at the second step is expressed by the following Equation:

$$i(t)=\beta \cos(2\pi f_i t+\phi)$$

where $i(t)$ is the narrowband interference signal, $f_i$ is the center frequency of the narrowband interference signal, $\beta$ is the magnitude of the narrowband interference signal, and $\phi$ is the phase of the narrowband interference signal.

Further, the first step includes a first process of generating a time clock having a Pseudorandom Noise (PN) code; a second process of generating a transmission modulation waveform, and combining the transmission modulation waveform with the time clock, thereby generating the transmission signal; and a third process of transmitting the transmission signal to the target object.

Furthermore, the transmission modulation waveform is a Gaussian pulse waveform.

Moreover, the channel estimation signal is a signal in which the time clock having the PN code and the channel impulse response signal are convoluted.

Here, the distance to the target object at the fifth step is calculated using the following Equation:

$$d = \frac{c_i \tau_e}{2}$$

where d is the distance to the target object, $c_i$ is a wireless transmission speed, and $\tau_e$ is a time delay when the correlation output signal has the maximum value thereof.

In order to accomplish the above object, the present invention provides a UWB ranging system using a narrowband interference suppression waveform including a reception antenna for receiving a signal reflected from a target object; a channel estimation module for estimating a channel impulse response and outputting a channel estimation signal; a reference waveform generator for generating a narrowband interference suppression waveform; and a distance calculation module for calculating a distance to the target object using a correlation output signal in which a template signal, in which the channel estimation signal and the narrowband interference suppression waveform are combined together, and the received signal are convoluted; wherein the narrowband interference suppression waveform is any one of two waveforms expressed by the following Equation:

$$w_{r1}(t) = g(t-\delta_1/2) + g(t+\delta_1/2)$$

$$w_{r2}(t) = g(t-\delta_2/2) - g(t+\delta_2/2)$$

where g(t) is a basic UWB pulse waveform, $\delta_1 = (N+1/2)f_1$, $\delta_2 = (N)/f_1$, N is an integer, and $f_i$ is the center frequency of a narrowband interference signal.

Further, the UWB ranging system further includes a system clock module for generating a time clock; a PN sequence generator for adding a PN code to the time clock; a transmission waveform generator for generating a transmission modulation waveform; and a transmission antenna for transmitting a transmission signal in which the time clock and the transmission modulation waveform are combined together.

BRIEF DESCRIPTION OF THE DRAWINGS

The above and other object, features and other advantages of the present invention will be more clearly understood from the following detailed description taken in conjunction with the accompanying drawings, in which.

DESCRIPTION OF THE PREFERRED EMBODIMENTS

Hereinafter, a UWB ranging method and system using a narrowband interference suppression waveform according to the present invention will be described in detail with reference to the attached drawings.

Ranging is the measurement of a distance to a remote target object from a known observation or reference point.

Figure 1:
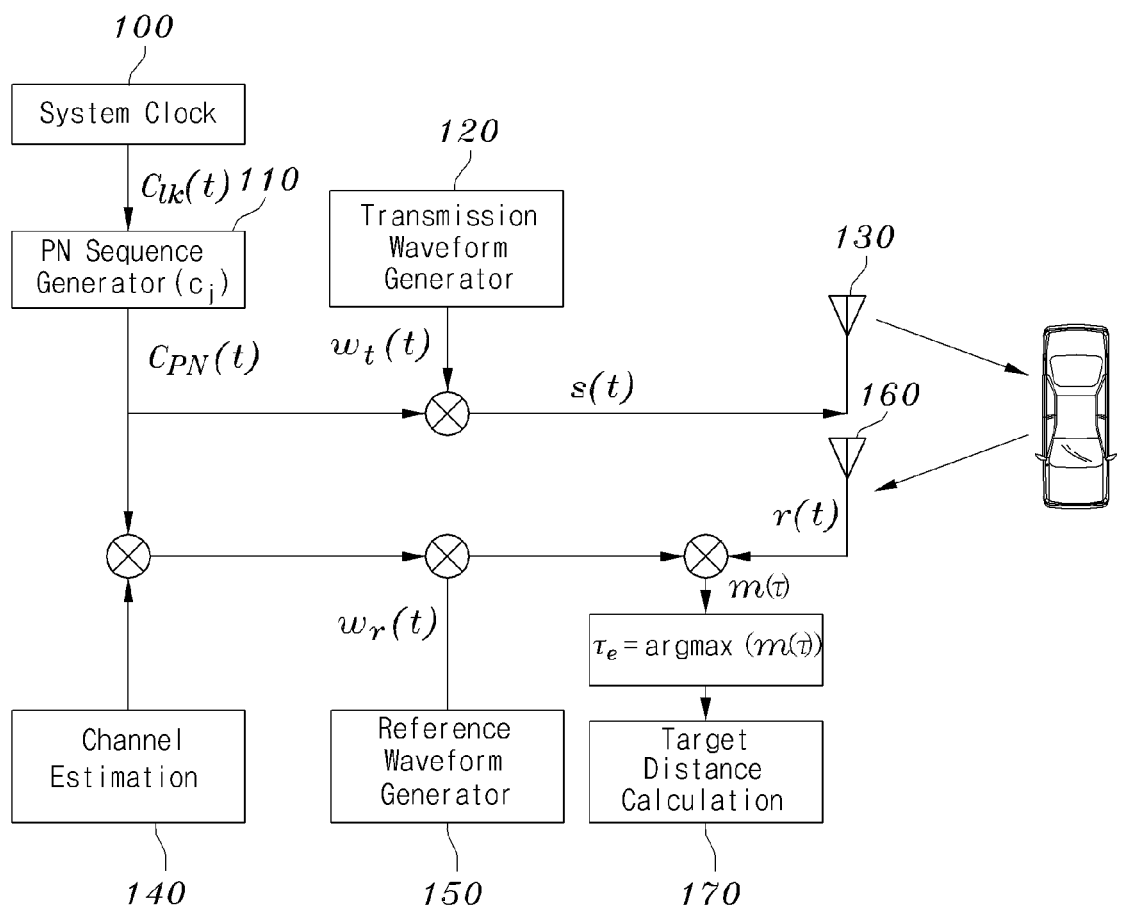
FIG. 1 is a diagram showing the configuration of a UWB ranging system using a narrowband interference suppression waveform according to the present invention.
Figure 2:
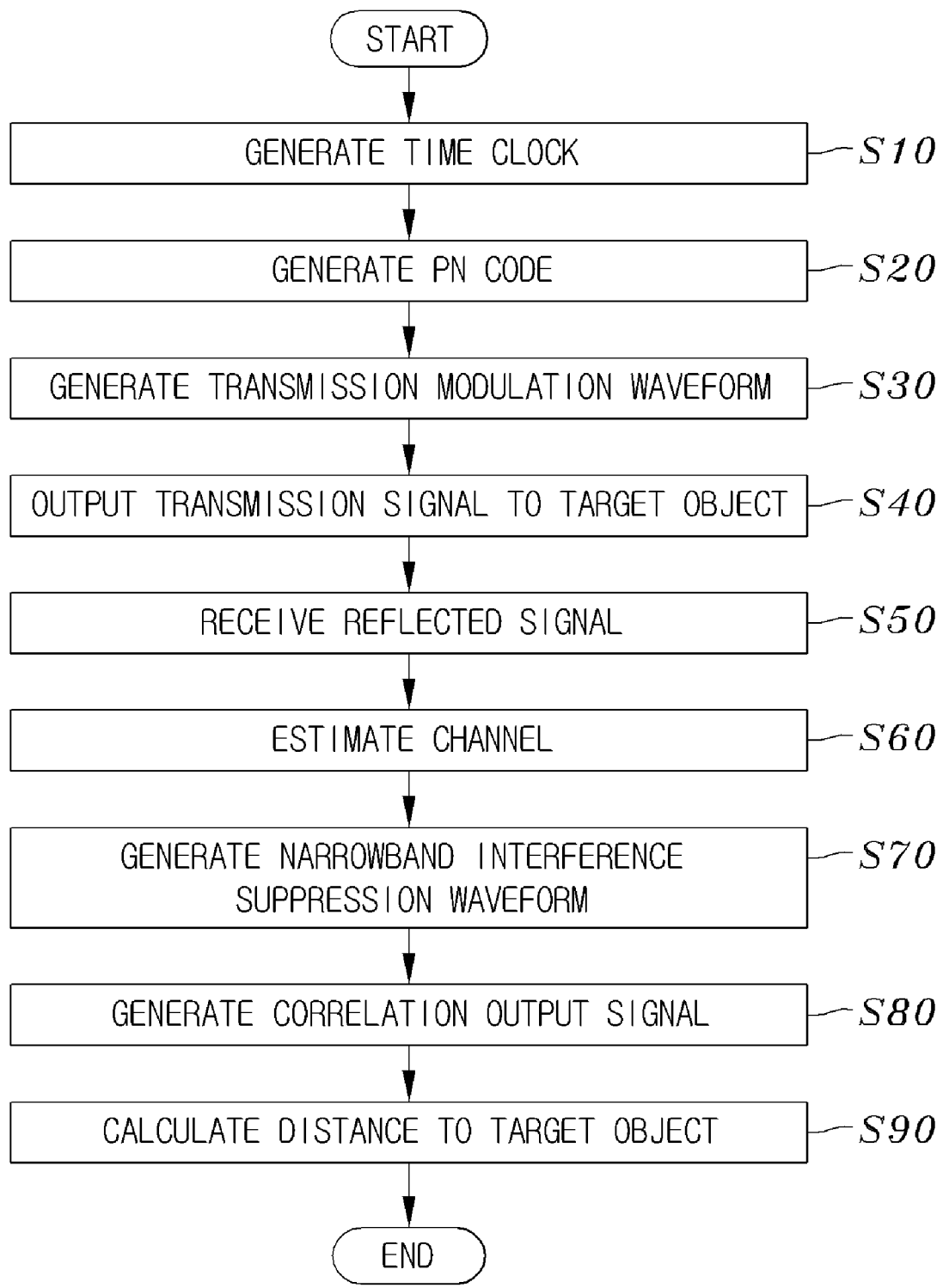
FIG. 2 is a flowchart showing a UWB ranging method using a narrowband interference suppression waveform according to the present invention.

FIG. 1 is a diagram showing the configuration of the UWB ranging system using a narrowband interference suppression waveform according to the present invention, and FIG. 2 is a flowchart showing a UWB ranging method using a narrowband interference suppression waveform according to the present invention.

First, a system clock module 100 generates a time clock at step S10.

A time clock signal is expressed by the following Equation 1:

$$C_{lk}(t) = \sum_{i=0}^{\infty} \sum_{j=0}^{N_p} \delta(t - (iN_P + j)T_f) \qquad \text{Equation 1}$$

where, $N_P$ indicates a period, and $T_f$ indicates a time interval between two pulses.

Next, a Pseudorandom Noise (PN) sequence generator generates PN, indicated by a code $C_j$, and combines the PN with the time clock at step S20.

The time clock having a PN code is expressed by Equation 2.

$$C_{PN}(t) = \sum_{i=0}^{\infty} \sum_{j=0}^{N_p} C_j \delta(t - (iN_P + j)T_f) \qquad \text{Equation 2}$$

where, $C_j$ indicates a bipolar PN sequence having a period $N_P$.

Next, a transmission waveform generator 120 generates a transmission modulation waveform at step S30.

The transmission modulation waveform $w_t(t)$ can employ a Gaussian pulse waveform as an example.

The time clock, having a PN code, is combined with the transmission modulation waveform generated by the transmission waveform generator 120, thereby constructing a transmission signal. The transmission signal is output to a target object through a transmission antenna 130 at step S40.

In the UWB ranging system according to the present invention, the transmission signal is expressed by the following Equation 3:

$$s(t) = \sqrt{E} \sum_{i=-\infty}^{\infty} \sum_{j=0}^{N_p-1} c_j w_t(t - (iN_P + j)T_f) \quad \text{Equation 3}$$

In Equation 3, $C_j$ indicates a bipolar PN sequence having a period $N_P$. Further, E indicates the energy used to transmit an actual single pulse. $w_t(t)$ indicates a transmission waveform having a regularized energy, and $T_f$ indicates a time interval between two pulses, Where i indicates a bit sequence number and j indicates the pulse sequence number of a single bit.

The transmitted transmission signal is reflected from the target object, and is then received through a reception antenna 160 at step S50.

Next, the configuration and operation of a reception module will be described.

Assuming that a channel which includes $N_k$ number of paths, the magnitude of which is $a_k$ and the time delay of which is $\tau_k$, and in which transmission and reflection are realized. Where, k indicates the sequence number of the path of the channel. If it is assumed that $\tau_k$ is the transmission delay of a k-th path and the relationship between delays is $\tau_{Nk-1} > \tau_{Nk} > \ldots > \tau_1 > \tau_0 \geq 0$, the reception signal to be received through the reception antenna 160 is expressed by the following Equation 4:

$$r(t) = \sqrt{E} \sum_{k=0}^{N_k-1} \alpha_k \sum_{i=-\infty}^{\infty} \sum_{j=0}^{N_p-1} c_j w_r(t - (iN_P + j)T_f - \tau(d) - \tau_k) + \quad \text{Equation 4}$$

$$i(t) + n(t)$$

where, $w_r(t)$ is a reception waveform having a regularized energy, and $i(t)$ is an interference signal. $n(t)$ is Additive White Gaussian Noise (AWGN).

In a reception side, a channel estimation module 140 outputs a channel estimation signal by estimating a channel impulse response at step S60.

The channel estimation signal is a signal in which the time clock having the PN code and a channel impulse response signal are convoluted together.

Next, a reference waveform generator 150 generates a narrowband interference suppression waveform $w_r(t)$ as expressed by Equation 11, and generates a template signal $v(t)$ by combining the generated narrowband interference suppression waveform $w_r(t)$ with the channel estimation signal at step S70.

If it is assumed that the ranging system according to the present invention knows such a channel model, for example, if all the $N_k$ Number of paths, each having a magnitude of $a_k$ and a delay of $\tau_k$, are obtained using a channel estimation method, the reception module corresponds to a Rake receiver having a number of fingers corresponding to $N_k$.

The reference signal $v_k(t)$ of the template signal is generated by the slide correlator of a k-th finger, and can be expressed by the following Equation 5:

$$v_k(t) = \sum_{i=-\infty}^{\infty} \sum_{j=0}^{N_P} c_j w_r(t - (iN_P + j)T_f - \tau_k) \quad \text{Equation 5}$$

An i-th output among the outputs of the correlator of the k-th finger is expressed by the following Equation 6:

$$m_k(i, \tau) = \int_{iN_PT_f+\tau_k}^{(i+1)N_PT_f+\tau_k} r(t)v_k(t - \tau)dt \quad \text{Equation 6}$$

$$\approx \alpha_k \sqrt{E} N_P R(\tau - \tau(d)) + i_k(\tau) + n_k(\tau)$$

where, R(t) is the autocorrelation function of $w_r(t)$. Equation 6 can be simplified as the following Equation 7:

$$r = s + i + n \quad \text{Equation 7}$$

In Equation 7, S, i, and n are $N_k \times 1$ vectors. In the reception side, a vector c=a is used in order to correlate r, which indicates a reception signal.

The correlation output signal, in which the reception signal and the template signal are convoluted together, may be given as the following Equation 8 at step S80:

$$m(\tau) = \left(\sqrt{E} N_P R(\tau - \tau(d))\right)^2 + \alpha^H \alpha + \alpha^H (R_i(\tau) + R_n(\tau))\alpha \quad \text{Equation 8}$$

where, $R_n(\tau)$ is $E\{n(\tau)n(\tau)^H\}$, and is a diagonal matrix of $N_k \times N_k$. $R_i(\tau)$ is an $E\{i(\tau)i(\tau)^H\}$ correlation matrix. The time delay $\tau_e$ to be estimated is given as the following Equation 9:

$$\tau_e = \arg_\tau \max(m(\tau)) \quad \text{Equation 9}$$

A distance calculation module 170 calculates a distance to a target object using the estimated time delay value at step S90. The time delay value is a time delay value when the correlation output signal has the maximum value thereof.

Here, the distance d to a target object is $c_j\tau_e/2$, where $c_j$ indicates a wireless transmission speed.

The suppression of interference using a interference suppression waveform according to the present invention will be described below.

The interference element of an output module is $a^H(R_i(\tau))a$. The element $\{k,l\}$ of $R_i(\tau)$ is expressed by the following Equation 10:

$$[R_i(\tau)]_{k,l} = E\{i_k(\tau)i_l^*(\tau)\} \quad \text{Equation 10}$$

$$\approx N_P \int_{-\infty}^{\infty} \int_{-\infty}^{\infty} R_i(t - t' + \tau_k - \tau_l)w_r(t)w_r(t')dt\,dt'$$

where $R_i(t)$ is the autocorrelation of the interference signal $i(t)$. $\tau_k$ and $\tau_l$ respectively indicate the transmission delay values of k-th and l-th paths. Here, it is found that $R_i(\tau)$ is not a function about $\tau$.

The two narrowband interference suppression waveforms provided by the present invention are expressed by the following Equation 11:

$$w_{r1}(t) = g(t - \delta_1/2) + g(t + \delta_1/2)$$

$$w_{r2}(t) = g(t - \delta_2/2) - g(t + \delta_2/2) \quad \text{Equation 11}$$

where g(t) is a basic UWB pulse waveform. As long as a waveform satisfies the spectrum mask of the Federal Communications Commission (FCC), the corresponding waveform can be g(t). The present invention employs Gaussian monocycle as an example. If $w_r(t)$ of Equation 10 is replaced with $w_{r1}(t)$ and $w_{r2}(t)$ of Equation 11, and then it is assumed that an UWB spectrum is uniform over the entire range of frequencies of the narrowband interference based on $f_i$, which is the $\{k,l\}$ element of $R_i(\tau)$, the following Equation 12 can be obtained:

$$[R_i]_{k,l,1} = N_P |G(f_i)|^2 [2R_i(\tau_k - \tau_l) + R_i(\tau_k - \tau_l - \delta_1) + R_i(\tau_k - \tau_l + \delta_1)]$$

$$[R_i]_{k,l,2}=N_P|G(f_i)|^2[2R_i(\tau_k-\tau_l)+R_i(\tau_k-\tau_l-\delta_2)+R_i(\tau_k-\tau_l+\delta_2)] \quad \text{Equation 12}$$

where, $f_i$ is the center frequency of the narrowband interference i(t), and G(f) is the Fourier conversion of g(t). The single tone interference of the frequency $f_i$ may be considered to be the cause of the narrowband interference.

Here, narrowband interference i(t) can be expressed by the following Equation 13:

$$i(t)=\beta\cos(2\pi f_i t+\phi) \quad \text{Equation 13}$$

where, $\beta$ indicates the magnitude of the narrowband interference, and $\phi$ indicates the phase of the narrowband interference. The regularized autocorrelation function of the narrowband interference is simply defined as the following Equation 14:

$$R_i(t)=\cos(2\pi f_i t) \quad \text{Equation 14}$$

Therefore, Equation 12 can be defined as the following Equation 15:

$$[R_i]_{k,l,1}=4N_P|G(f_i)|^2=\cos(2\pi f_i)(\tau_k-\tau_l))\cos^2(\pi f_i\delta_1)$$

$$[R_i]_{k,l,2}=4N_P|G(f_i)|^2=\cos(2\pi f_i)(\tau_k-\tau_l))\sin^2(\pi f_i\delta_2) \quad \text{Equation 15}$$

If setting is made such that $\delta_1=(N+1/2)f_1$ or $\delta_2=(N)/f_1$ (where N is an integer), $\cos^2(\pi f_i\delta_1)=0$ or $\sin^2(\pi f_i\delta_2)=0$, with the result that $R_i=0$, so that narrowband interference is suppressed.

Figure 3A:
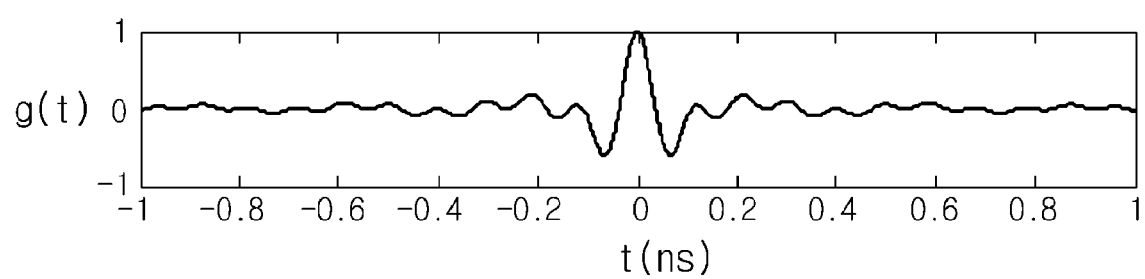
FIG. 3A is a graph showing a typical Gaussian waveform.
Figure 3B:
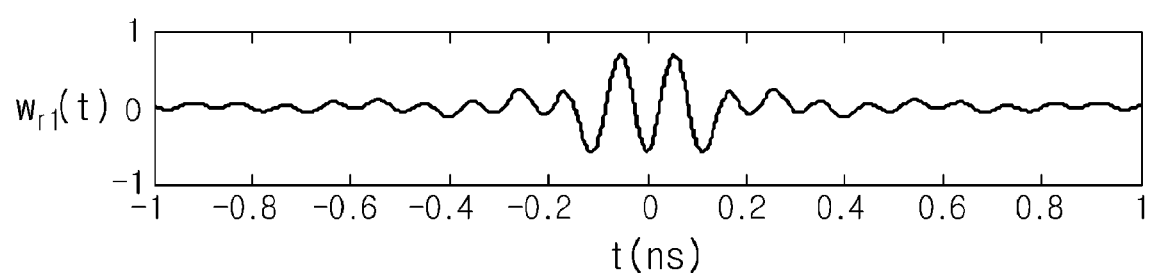
FIGS. 3B and 3C are graphs showing two transmission waveforms obtained using the narrowband interference suppression method of the UWB ranging system according to the present invention.
Figure 3C:
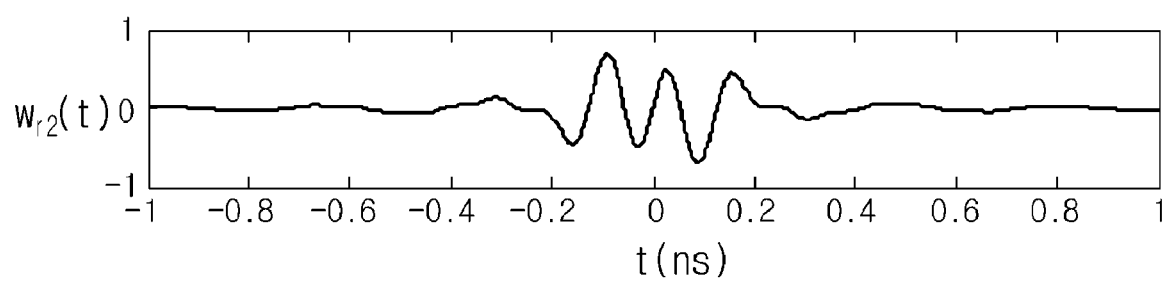
Figure 4:
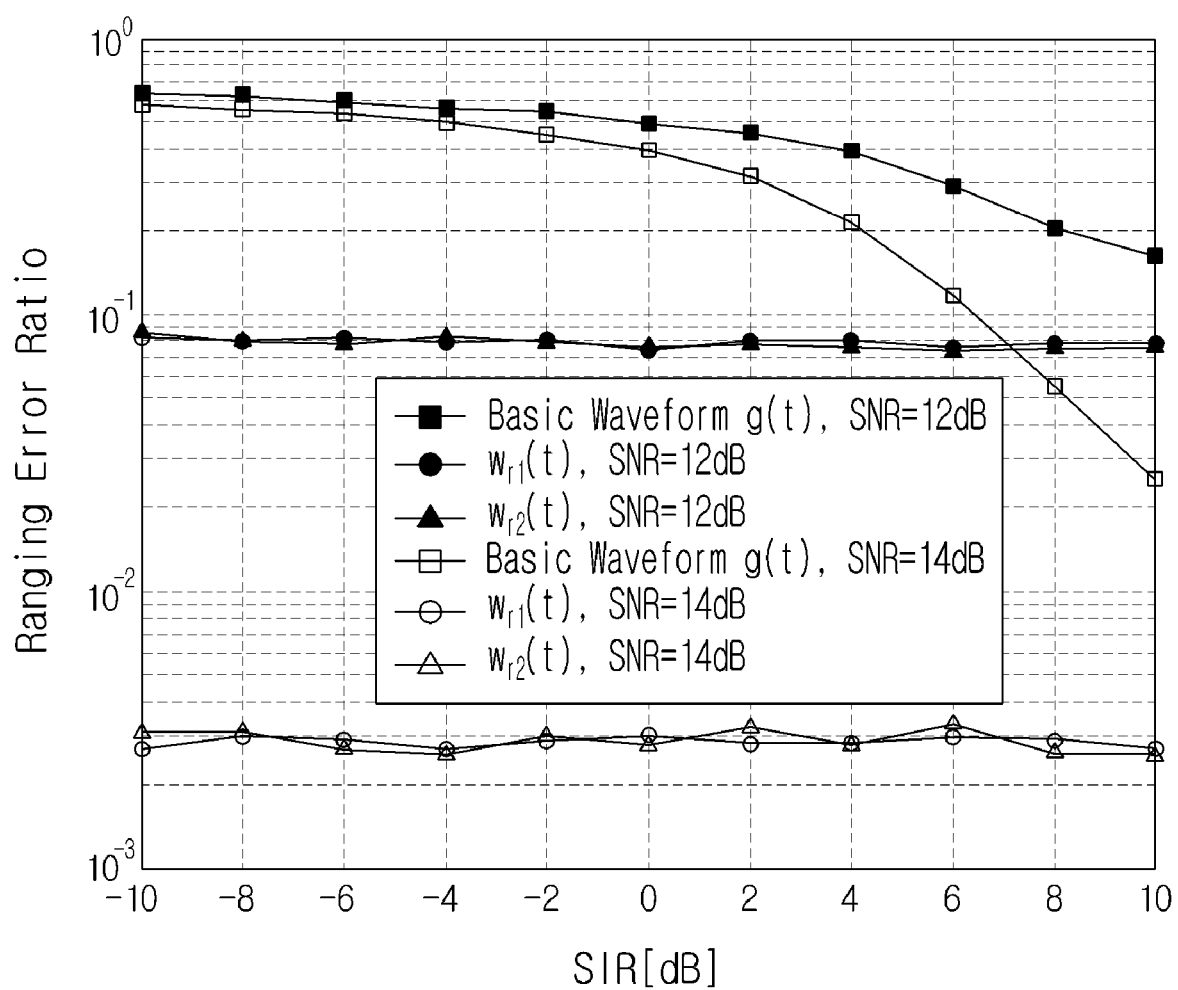
FIG. 4 is a graph showing the results of the comparison of the respective ranging error ratios of the typical Gaussian waveform and the two transmission waveforms, obtained using the narrowband interference suppression method of the UWB ranging system according to the present invention, and the results of the comparison of the respective SIR performance of the typical Gaussian waveform and the two transmission waveforms, obtained using the narrowband interference suppression method of the UWB ranging system according to the present invention.

FIG. 3A is a graph showing a typical Gaussian waveform, and FIGS. 3B and 3C are graphs showing two transmission waveforms obtained using the narrowband interference suppression method of the UWB ranging system according to the present invention, and FIG. 4 is a graph showing the results of the comparison of the respective ranging error ratios of the typical Gaussian waveform and the two transmission waveforms, obtained using the narrowband interference suppression method of the UWB ranging system according to the present invention, and the results of the comparison of the respective SIR performance of the typical Gaussian waveform and the two transmission waveforms, obtained using the narrowband interference suppression method of the UWB ranging system according to the present invention.

A ranging system, based on a conventional Gaussian monocycle, and a ranging system, based on the two waveforms provided according to the present invention, are implemented. The ranging performance is estimated based on the ranging error ratio. In a simulation, the length of a waveform is 0.5 ns, and the narrowband center frequency fi is 5.3 GHz. Further, $\delta_1=0.5/\text{fi}=0.0943$ ns, and $\delta_2=1/f_i=0.1887$ ns.

In this case, waveforms are shown as in FIGS. 3A to 3C. The longest ranging distance is set to 30 m, and an evaluation error threshold is set to 0.3 m. The results of the comparison of the ranging error ratios and the Signal to Interference Ratio (SIR) performance for the three waveforms are shown in FIG. 4. According to the results of the simulation, the ranging system, based on the two waveforms provided according to the present invention, shows a lower ranging error ratio than the ranging system using the conventional Gaussian monocycle. In particular, it can be known that the ranging error ratio is further low when interference output is high.

The present invention provides the UWB ranging system based on two waveforms capable of suppressing narrowband interference using a specific frequency. From the results of simulation, it can be known that the ranging system according to the present invention can realize a lower ranging error ratio than the ranging system based on a typical Gaussian monocycle.

The UWB ranging method and system using a narrowband interference suppression waveform according to the present invention, configured as described above, suppresses a narrowband interference signal from a signal, reflected from a target object and then received, using two narrowband interference suppression waveforms, regardless of the transmission waveforms, so that there is an advantage in that the accuracy of the ranging system is improved.

Although the UWB ranging method and system using a narrowband interference suppression waveform according to the present invention has been described with reference to the attached drawings, those skilled in the art will appreciate that various modifications, additions and substitutions are possible, without departing from the scope and spirit of the invention as disclosed in the accompanying claims.

What is claimed is:

1. An Ultra-WideBand (UWB) ranging method using a narrowband interference suppression waveform, comprising:
    a first step of transmitting a transmission signal to a target object;
    a second step of receiving the transmission signal reflected from the target object;
    a third step of generating a template signal by combining the narrowband interference suppression waveform and a channel estimation signal together;
    a fourth step of generating a correlation output signal by convoluting the template signal and the signal received at the second step; and
    a fifth step of calculating a distance using a time delay when the correlation output signal has a maximum value thereof;
    wherein the narrowband interference suppression waveform is any one of two waveforms that are expressed by the following Equation:

$$w_{r1}(t)=g(t-\delta_1/2)+g(t+\delta_1/2)$$

$$w_{r2}(t)=g(t-\delta_2/2)-g(t+\delta_2/2)$$

where g(t) is a basic UWB pulse waveform, $\delta_1=(N+1/2)f_1$, $\delta_2=(N)f_1$, N is an integer, and $f_i$ is a center frequency of a narrowband interference signal.

2. The UWB ranging method as set forth in claim 1, wherein the basic UWB pulse waveform is a Gaussian pulse waveform.

3. The UWB ranging method as set forth in claim 1, wherein the narrowband interference signal of the signal received at the second step is expressed by the following Equation:

$$i(t)=\beta\cos(2\pi f_i t+\phi)$$

where i(t) is the narrowband interference signal, $f_i$ is the center frequency of the narrowband interference signal, $\beta$ is a magnitude of the narrowband interference signal, and $\phi$ is a phase of the narrowband interference signal.

4. The UWB ranging method as set forth in claim 1, wherein the first step comprises:
    a first process of generating a time clock having a Pseudo-random Noise (PN) code;
    a second process of generating a transmission modulation waveform, and combining the transmission modulation waveform with the time clock, thereby generating the transmission signal; and
    a third process of transmitting the transmission signal to the target object.

5. The UWB ranging method as set forth in claim 4, wherein the transmission modulation waveform is a Gaussian pulse waveform.

6. The UWB ranging method as set forth in claim 4, wherein the channel estimation signal is a signal in which the time clock having the PN code and the channel impulse response signal are convoluted.

7. The UWB ranging method as set forth in claim 1, wherein the distance to the target object at the fifth step is calculated using the following Equation:

$$d = \frac{c_l \tau_e}{2}$$

where d is the distance to the target object, $c_l$, is a wireless transmission speed, and $\tau_e$ is a time delay when the correlation output signal has a maximum value thereof.

8. A UWB ranging system using a narrowband interference suppression waveform comprising:
  a reception antenna for receiving a signal reflected from a target object;
  a channel estimation module for estimating a channel impulse response and outputting a channel estimation signal;
  a reference waveform generator for generating a narrowband interference suppression waveform; and
  a distance calculation module for calculating a distance to the target object using a correlation output signal in which a template signal, in which the channel estimation signal and the narrowband interference suppression waveform are combined together, and the received signal are convoluted;
  wherein the narrowband interference suppression waveform is any one of two waveforms expressed by the following Equation:

$$w_{r1}(t) = g(t - \delta_1/2) + g(t + \delta_1/2)$$

$$w_{r2}(t) = g(t - \delta_2/2) - g(t + \delta_2/2)$$

where g(t) is a basic UWB pulse waveform, $\delta_1 = (N+1/2)f_1$, $\delta_2 = (N)/f_1$, N is an integer, and $f_i$ is a center frequency of a narrowband interference signal.

9. The UWB ranging system as set forth in claim 8, wherein the basic UWB pulse waveform is a Gaussian pulse waveform.

10. The UWB ranging system as set forth in claim 8, further comprising:
  a system clock module for generating a time clock;
  a PN sequence generator for adding a PN code to the time clock;
  a transmission waveform generator for generating a transmission modulation waveform; and
  a transmission antenna for transmitting a transmission signal in which the time clock and the transmission modulation waveform are combined together.

11. The UWB ranging system as set forth in claim 10, wherein the transmission modulation waveform is a Gaussian pulse waveform.

12. The UWB ranging system as set forth in claim 10, wherein the channel estimation signal is a signal in which the time clock having the PN code and the channel impulse response signal are convoluted.

13. The UWB ranging system as set forth in claim 8, wherein the distance calculation module calculates the distance to the target object using the following Equation:

$$d = \frac{C_l \tau_e}{2}$$

where d is the distance to the target object, $C_l$ is a wireless transmission speed, and $\tau_e$ is a time delay when the correlation output signal has a maximum value thereof.

* * * * *